US009716554B2

(12) United States Patent
Iizuka et al.

(10) Patent No.: US 9,716,554 B2
(45) Date of Patent: Jul. 25, 2017

(54) INFORMATION TRANSMISSION SYSTEM, INFORMATION SENDING DEVICE, INFORMATION RECEIVING DEVICE, INFORMATION TRANSMISSION METHOD, INFORMATION SENDING METHOD, INFORMATION RECEIVING METHOD AND PROGRAM PRODUCT

(71) Applicant: Casio Computer Co., Ltd., Shibuya-ku, Tokyo (JP)

(72) Inventors: Nobuo Iizuka, Hamura (JP); Keiichi Kaneko, Kawasaki (JP); Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 67 days.

(21) Appl. No.: 14/508,888

(22) Filed: Oct. 7, 2014

(65) Prior Publication Data

US 2015/0023673 A1    Jan. 22, 2015

Related U.S. Application Data

(62) Division of application No. 13/528,403, filed on Jun. 20, 2012, now Pat. No. 8,886,054.

(30) Foreign Application Priority Data

Jun. 23, 2011 (JP) .................................. 2011-139213
Jun. 23, 2011 (JP) .................................. 2011-139233

(51) Int. Cl.
*H04B 10/116* (2013.01)
*H04B 10/516* (2013.01)
(Continued)

(52) U.S. Cl.
CPC .......... *H04B 10/516* (2013.01); *H04B 10/11* (2013.01); *H04B 10/116* (2013.01);
(Continued)

(58) Field of Classification Search
CPC .................. H04B 10/116; H04B 10/11; G06K 2019/06225
(Continued)

(56) References Cited

U.S. PATENT DOCUMENTS 4,812,903 A    3/1989   Wagensonner et al.
5,793,501 A    8/1998   Murakami
(Continued)

FOREIGN PATENT DOCUMENTS

JP    2001-189660 A    7/2001
JP    2003-179556 A    6/2003
(Continued)

OTHER PUBLICATIONS

Chinese Office Action dated Oct. 10, 2014, issued in counterpart Chinese Application No. 201210210692.3.
(Continued)

*Primary Examiner* — David Payne
*Assistant Examiner* — Tanya Motsinger
(74) *Attorney, Agent, or Firm* — Holtz, Holtz & Volek PC

(57) ABSTRACT

An information transmission system includes: an information sending device including a light emitting section that emits light in a plurality of colors, a modulating section that modulates information to be transmitted into signals composed of changes in color, and a light emission control section that controls the light emitting section to emit light while changing color temporally based on the signals generated by the modulating section; and a receiving device including a camera that captures an image having color, and a control and communication section that detects a temporal
(Continued)

color change of the light emitting section emitting light by light emission control by the information transmitting device, from images consecutively captured by the camera, decodes the detected color change into information, and outputs the generated information to a display section.

7 Claims, 20 Drawing Sheets

(51) Int. Cl.
    *H04B 10/112*     (2013.01)
    *H04B 10/548*     (2013.01)
    *H04B 10/69*     (2013.01)
    *H04B 10/11*     (2013.01)

(52) U.S. Cl.
    CPC ....... *H04B 10/1129* (2013.01); *H04B 10/548* (2013.01); *H04B 10/69* (2013.01)

(58) Field of Classification Search
    USPC .................................................. 398/118, 172
    See application file for complete search history.

(56) References Cited

U.S. PATENT DOCUMENTS

| | | | |
|---|---|---|---|
| 6,674,485 | B2 | 1/2004 | Akiyama et al. |
| 6,933,956 | B2 | 8/2005 | Sato et al. |
| RE42,848 | E | 10/2011 | Sato et al. |
| 2003/0133044 | A1 | 7/2003 | Akiyama et al. |
| 2004/0002365 | A1 | 1/2004 | Ota et al. |
| 2004/0125110 | A1* | 7/2004 | Kohda ................. G06F 3/1462 345/501 |
| 2009/0052902 | A1* | 2/2009 | Shinokura ............ H04B 10/116 398/118 |
| 2009/0297158 | A1 | 12/2009 | Iizuka |
| 2010/0209118 | A1* | 8/2010 | Takene ................. H04B 10/116 398/182 |
| 2010/0247112 | A1 | 9/2010 | Chang |
| 2010/0301120 | A1 | 12/2010 | Kimura |
| 2011/0135317 | A1* | 6/2011 | Chaplin .............. H04B 10/116 398/172 |
| 2011/0150285 | A1* | 6/2011 | Kimura ..................... G01S 5/16 382/103 |
| 2011/0200338 | A1 | 8/2011 | Yokoi |
| 2012/0128365 | A1 | 5/2012 | Paek et al. |
| 2013/0330088 | A1* | 12/2013 | Oshima .................. H04B 10/11 398/130 |
| 2014/0186050 | A1* | 7/2014 | Oshima .............. H04B 10/1143 398/118 |
| 2014/0241735 | A1* | 8/2014 | Bohler ................. H04B 10/116 398/186 |
| 2014/0286644 | A1* | 9/2014 | Oshima .................. H04B 10/11 398/118 |
| 2015/0023669 | A1* | 1/2015 | Jiang .................... H04B 10/116 398/118 |
| 2015/0104183 | A1* | 4/2015 | Jeffrey ..................... G09C 5/00 398/130 |
| 2015/0104184 | A1* | 4/2015 | Jeffrey ..................... G09C 5/00 398/130 |
| 2015/0104187 | A1* | 4/2015 | Jeffrey ................. H04L 9/3271 398/140 |
| 2015/0188633 | A1* | 7/2015 | Liu ...................... H04B 10/116 398/118 |

FOREIGN PATENT DOCUMENTS

| | | |
|---|---|---|
| JP | 2005-136665 A | 5/2005 |
| JP | 2005-267169 A | 9/2005 |
| JP | 2006-072778 A | 3/2006 |
| JP | 2006-121466 A | 5/2006 |
| JP | 2007-248861 A | 9/2007 |
| JP | 2009-186203 A | 8/2009 |
| JP | 2010050720 A | 3/2010 |
| JP | 2010-287820 A | 12/2010 |
| JP | 2011-029871 A | 2/2011 |
| WO | WO 2006/109829 A1 | 10/2006 |
| WO | WO 2010/021273 A1 | 2/2010 |

OTHER PUBLICATIONS

Japanese Office Action dated Mar. 7, 2013 (and English translation thereof) in counterpart Japanese Application No. 2011-139213.
Japanese Office Action dated Mar. 7, 2013 (and English translation thereof) in counterpart Japanese Application No. 2011-139233.
Extended European Search Report (EESR) dated Oct. 30, 2012 (in English) in counterpart European Application No. 12170661.8.
Chinese Office Action (and English translation thereof) dated Dec. 9, 2015, issued in counterpart Chinese Application No. 201210210692.3.

* cited by examiner 5 (1061~1064)

| ENCODING SIGNAL | INPUT VALUE (NO REDUNDANCY) | INPUT VALUE (LOW REDUNDANCY) | INPUT VALUE (MEDIUM REDUNDANCY) | INPUT VALUE (HIGH REDUNDANCY) |
|---|---|---|---|---|
| 111 | 1 | — | — | — |
| 112 | 2 | 1 | 1 | — |
| 113 | 3 | 2 | 2 | — |
| 121 | 4 | 3 | 3 | — |
| 122 | 5 | 4 | 4 | — |
| 123 | 6 | 5 | 5 | 1 |
| 131 | 7 | 6 | 6 | — |
| 132 | 8 | 7 | 7 | 2 |
| 133 | 9 | 8 | 8 | — |
| 211 | 10 | 9 | 8 | — |
| 212 | 11 | 10 | 6 | — |
| 213 | 12 | 11 | 7 | 3 |
| 221 | 13 | 12 | 2 | — |
| 222 | 14 | — | — | — |
| 223 | 15 | 13 | 1 | — |
| 231 | 16 | 14 | 5 | 4 |
| 232 | 17 | 15 | 3 | — |
| 233 | 18 | 16 | 4 | — |
| 311 | 19 | 17 | 4 | — |
| 312 | 20 | 18 | 5 | 5 |
| 313 | 21 | 19 | 3 | — |
| 321 | 22 | 20 | 8 | 6 |
| 322 | 23 | 21 | 7 | — |
| 323 | 24 | 22 | 6 | — |
| 331 | 25 | 23 | 1 | — |
| 332 | 26 | 24 | 2 | — |
| 333 | 27 | — | — | — |
| | 27 VALUES | 24 VALUES | 8 VALUES | 6 VALUES |

FIG.13

| Fn=0 | | | |
|---|---|---|---|
| AREA No. (A) | GRAVITY CENTER COORDINATES (cx,xy) | AREA (Size) | HUE VALUE (Hue) |
| 0 | 10, 50 | 70 | 80 |
| 1 | 111, 321 | 23 | 200 |

FIG.18

| AREA CANDIDATE No. | F0:An: (Hue) | F1:An: (Hue) | F2:An: (Hue) | F3:An: (Hue) | F4:An: (Hue) |
|---|---|---|---|---|---|
| 0 | 10 | 15 | −1 | −1 | 232 |
| 1 | 115 | 236 | 18 | 242 | 10 |
| 2 | 238 | −1 | 65 | 119 | 120 |
| 3 | 16 | −1 | 123 | 180 | 236 |
| 4 | 121 | −1 | 11 | 12 | 11 |

…

INFORMATION TRANSMISSION SYSTEM, INFORMATION SENDING DEVICE, INFORMATION RECEIVING DEVICE, INFORMATION TRANSMISSION METHOD, INFORMATION SENDING METHOD, INFORMATION RECEIVING METHOD AND PROGRAM PRODUCT

CROSS-REFERENCE TO RELATED APPLICATIONS

This is a Divisional of U.S. application Ser. No. 13/528,403, filed Jun. 20, 2012, which is based upon and claims the benefit of priority from prior Japanese Patent Applications No. 2011-139213 and No. 2011-139233, both filed Jun. 23, 2011, the entire contents of all of which are incorporated herein by reference.

BACKGROUND OF THE INVENTION

1. Field of the Invention

The present invention relates to an information transmission system, an information sending device, an information receiving device, an information transmission method, an information sending method, an information receiving method, and a program product using a spatial optical transmission technology.

2. Description of the Related Art

In recent years, so-called digital signage is gaining attention as an information transmission system using a spatial optical transmission technology. The digital signage refers to a system for transmitting information in a location other than home, such as outdoors, transportation facilities, storefronts, and public facilities, using a display device connected to a network.

FIG. 1 is a diagram showing the use of the digital signage. In FIG. 1, an outdoor scene 100 is shown in the center, which includes pedestrians 101 and vehicles 102, as well as buildings 103 to 105 located in the background. In particular, the building 104 in the center has a large-scale display terminal 106 mounted on a wall surface thereof.

The display terminal 106 is a display device for digital signage that visualizes and displays information 107 transmitted from a server (not shown). This information 107 is, for example, information related to a certain product. In the example shown in FIG. 1, an image of a wristwatch is displayed as the product.

In order to sell this product, the price, the sales period, the sales location, etc. need to be announced.

In the example shown in FIG. 1, light modulation areas 1061 to 1064 are provided for the delivery of the above-described information. These modulation areas 1061 to 1064 are provided in portions (the four corners in FIG. 1) of the screen of the display terminal 106, and the required information is transmitted by time-serial changes of the light thereof.

As a result, when people on the street catch sight of the display on the display terminal 106 and capture an image of the advertisement using his or her mobile electronic unit 108, they can know detailed information related to the product, such as the price, the sales period and the sales location.

In the case of the example shown in FIG. 1, a picture 110 of the product and a words balloon 111 containing detailed information on the product (information on discounts, such as 50% OFF, the discount period, such as from 11:00 to 15:00, and the like) are displayed on the screen 109 of the mobile electronic unit 108.

As types of spatial "optical" transmission technology, for example, the following are known.

In U.S. Pat. No. 6,933,956, a technology for a spatial optical transmission system composed of a light transmitting unit and a light receiving unit is described.

An overview of the technology is basically as follows: A light emitting unit logically determines a bit sequence that structures information to be transmitted; alternatively selects a bit pattern sequence from two pre-prepared bit pattern sequences having a low correlation with each other, based on the determination result; modulates the light in accordance with the selection result; and transmits the modulated light. A light-receiving unit receives the light and generates a binarized signal based on the intensity of the light; generates a logic signal 1 or a logic signal 0, when the bit pattern sequence included in the binarized signal corresponds to either one of the two bit pattern sequences; and reproduces the information included in the light.

In Japanese Patent Application Laid-Open (Kokai) Publication No. 2005-267169, a technology is described which actualizes pointing by using flashing signals that are colored and have the same hue value.

In Japanese Patent Application Laid-Open (Kokai) Publication No. 2006-072778, a technology is described in which four states are transmitted and received using prescribed changes in hue difference.

In Japanese Patent Application Laid-Open (Kokai) Publication No. 2010-287820, a technology for actualizing high-speed communication is described in which, in addition to color changes, one of the colors is flashed at high speed, the light intensity is detected by a photodiode other than that of the image sensor being added, and thereby another signal is superimposed.

In Japanese Patent Application Laid-Open (Kokai) Publication No. 2009-186203, a technology is described in which transmission is performed by a combination of light-emitting bodies in three colors.

However, the technology described in U.S. Pat. No. 6,933,956 is merely a transmission technology based on the blinking of light which performs optical transmission using the logical signal 1 and the logical signal 0. Therefore, there is a problem in that, when signals (binary modulation signals) generated by binary blinking of light are received by a popularized camera having a common frame rate (about 30 fps) and information is reproduced, a considerable amount of time is required (about two seconds, described in detail hereafter).

Although modulation of multivalued light using a combination of the colors red (R), green (G), and blue (B) as in the other known technologies can be performed to solve this problem, simply performing the value multiplexing increases processing load on the light receiving device.

SUMMARY OF THE INVENTION

An object of the present invention is to enable the decoding of multivalued optical transmission information without increasing processing load.

In order to achieve the above-described object, in accordance with one aspect of the present invention, there is provided an information transmission system comprising: an information sending device including a light emitting section which emits light in a plurality of colors, a modulating section which modulates information to be transmitted into signals composed of changes in color, and a light emission control section which controls the light emitting section to emit light while changing color temporally based on the signals generated by the modulating section; and an information receiving device including an imaging section which captures an image having color, a detecting section which detects a temporal color change of the light emitting section emitting light by light emission control by the light emission control section from images consecutively captured by the imaging section, a decoding section which decodes the color change detected by the detecting section into information, and an information output section which outputs the information generated by the decoding section.

In accordance with another aspect of the present invention, there is provided an information sending device comprising: an image display section which has a light emitting section which emits light in a plurality of colors in pixel units; a modulating section which modulates information to be transmitted into signals composed of changes in color; and a light emission control section which controls a pixel area of the image display section to emit light while changing color temporally based on the signals generated by the modulating section.

In accordance with another aspect of the present invention, there is provided an information receiving device comprising: an imaging section which captures an image having color; a detecting section which detects a pixel area whose color changes temporally from images consecutively captured by the imaging section; a decoding section which decodes color change detected by the detecting section into information; and an information output section which outputs the information generated by the decoding section.

In accordance with another aspect of the present invention, there is provided an information transmission method comprising: a modulating step of modulating information to be transmitted into signals composed of changes in color; a light emission control step of controlling a light emitting section which emits light in a plurality of colors so that the light emitting section emits light while changing color temporally based on the signals generated in the modulating step; a detecting step of detecting a temporal color change of the light emitting section emitting light by light emission control in the light emission control step, from images consecutively captured by an imaging section which captures images having color; a decoding step of decoding the color change detected in the detecting step into information; and an information output step of outputting the information generated in the decoding step.

In accordance with another aspect of the present invention, there is provided an information sending method comprising: a modulating step of modulating information to be transmitted into signals composed of changes in color; and a light emission control step of controlling a pixel area of an image display section having a light emitting section which emits light in a plurality of colors in pixel units, so as to emit light while changing color temporally based on the signals generated in the modulating step.

In accordance with another aspect of the present invention, there is provided an information receiving method comprising: a detecting step of detecting a pixel area whose color changes temporally from images consecutively captured by an imaging section which captures an image having color; a decoding step of decoding color change detected in the detecting step into information; and an information output step of outputting the information generated in the decoding step.

In accordance with another aspect of the present invention, there is provided a non-transitory computer-readable storage medium having stored thereon a program that is executable by a computer controlling an image display device having a light emitting section which emits light in a plurality of colors in pixel units, the program being executable by the computer to perform functions comprising: modulation processing for modulating information to be transmitted into signals composed of changes in color; and light emission control processing for controlling a pixel area of the image display device to emit light while changing color temporally based on the signals generated by the modulation processing.

In accordance with another aspect of the present invention, there is provided a non-transitory computer-readable storage medium having stored thereon a program that is executable by a computer having an imaging section which captures an image having color, the program being executable by the computer to perform functions comprising: detection processing for detecting a pixel area whose color changes temporally from images consecutively captured by the imaging section; decode processing for decoding color change detected by the detection processing into information; and information output processing for outputting the information generated by the decode processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a diagram of an encoding table:

FIG. 13 is a diagram showing an example of a candidate area table;

FIG. 18 is a diagram showing an example of hue data extraction;

DETAILED DESCRIPTION OF THE PREFERRED EMBODIMENT

An embodiment of the present invention will be described with reference to the drawings.

Figure 1:
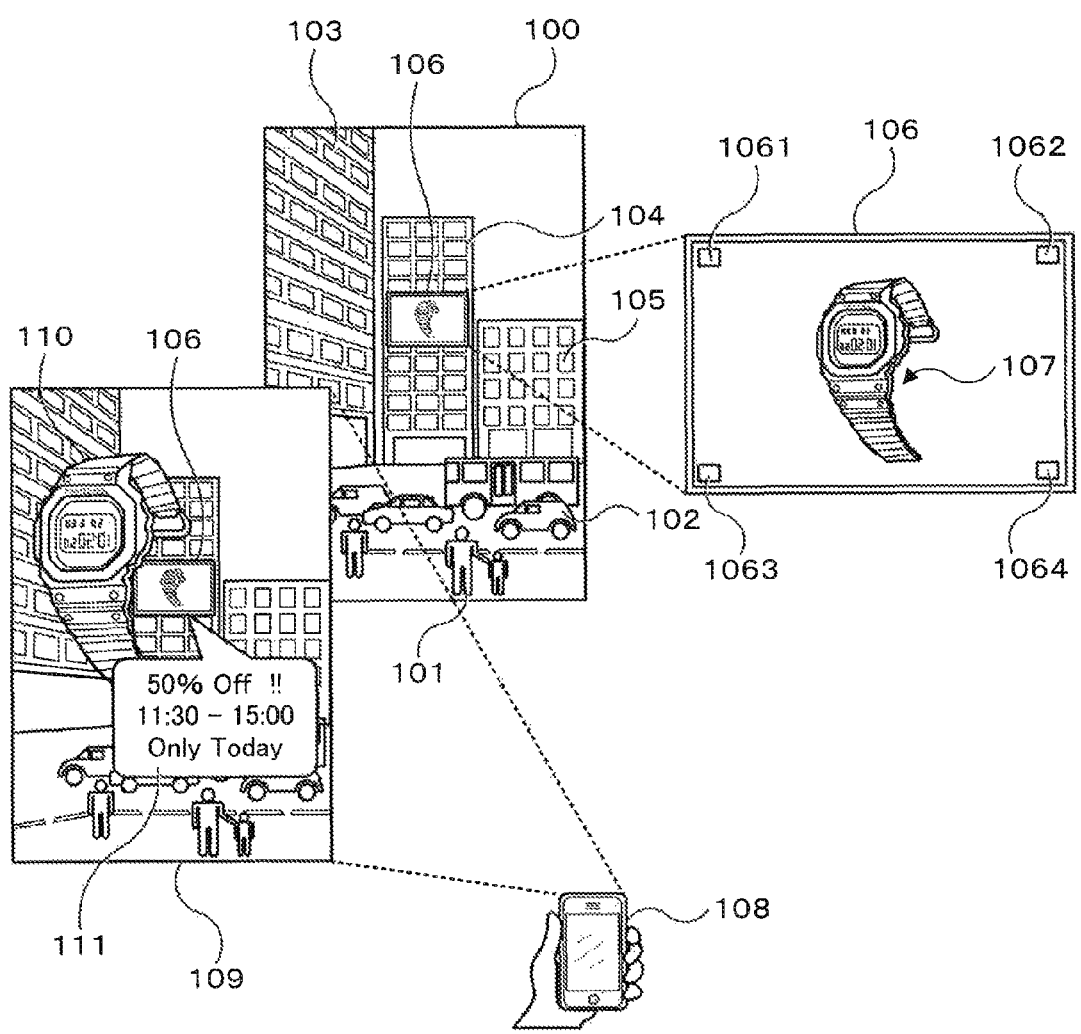
FIG. 1 is a diagram showing the use of digital signage.
Figure 2:
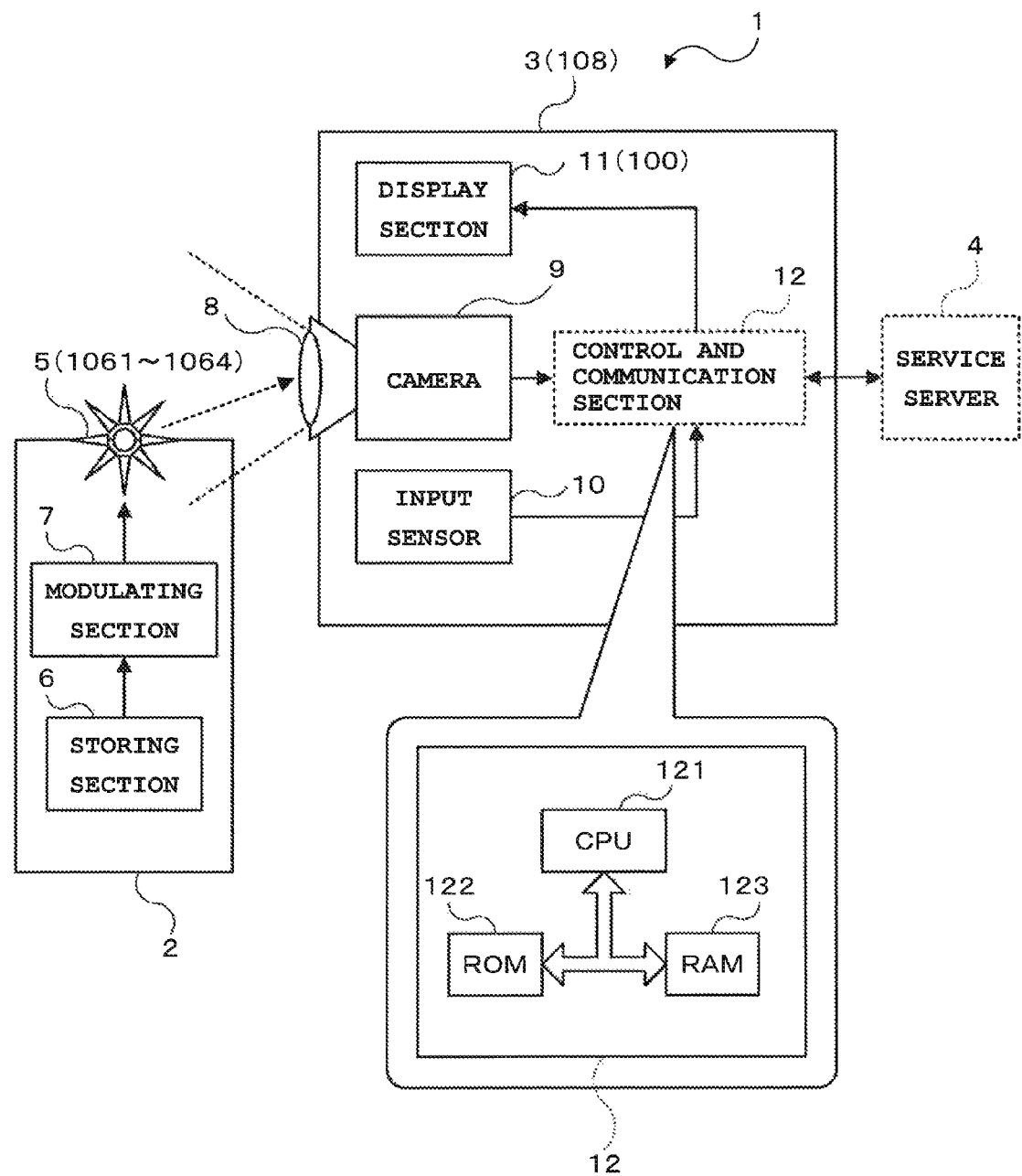
FIG. 2 is a block diagram of an information transmission system according to an embodiment.

FIG. 2 is a block diagram of an information transmission system used in FIG. 1. In FIG. 2, the information transmission system 1 includes a light emitting device 2, a light receiving device 3 and a service server 4.

The light emitting device 2 includes a light emitting section 5, a storing section 6 that stores information such as tag identification (ID), and a modulating section 7 for modulation-driving the light emitting section 5 (equivalent to 1061 to 1064 in FIG. 1) using information stored in the storing section 6, and is provided in a system for transmitting information by a display terminal 106, in locations such as outdoors, transportation facilities, storefronts, and public facilities.

The light emitting section 5 transmits required information (such as tag ID) based on the manner of light emission by the light emitting section 5 (temporal color change of emitted light and color intensity).

The light receiving device 3 is equivalent to a mobile electronic unit 108 in FIG. 1. This light receiving device 3 (108) is constituted by an optical system 8 including an imaging lens and the like, a camera 9, an input sensor 10, a display section 11 such as a liquid crystal display, a control and communication section 12, etc.

The service server 4 is, for example, a server that operates an information providing site or a product sales site (so-called online shop) on the Internet which is correlated to information transmitted by digital signage.

The camera 9 is composed of a two-dimensional imaging device mounted with a color filter, such as a charge-coupled device (CCD) or a complementary metal-oxide semiconductor (CMOS). The camera 9 consecutively captures images within a predetermined viewing angle at a cycle of several tens of frames per second, and outputs the captured images to the control and communication section 12. In this embodiment, the image-capturing cycle of the camera 9 is 30 frames per second (30 fps), taking the example of atypical (and also general-purpose) two-dimensional imaging device. The modulation frequency of the modulating section 7 of the light emitting device 2 is half of the image-capturing cycle, or in other words, 15 Hz.

The input sensor 10 is, for example, a sensor for detecting various information inputted by user operation. Specifically, the input sensor 10 is a QWERTY keyboard including a numeric keypad or a touch panel.

The display section 11 is a high-definition display device, such as a liquid crystal display. This display section 11 visualizes random information outputted accordingly from the control and communication section 12, and outputs and displays the visualized information.

The control and communication section 11 includes a communication interface that interfaces with the service server 4, a computer or a microcomputer (hereinafter, referred to as a central processing unit [CPU]) 121, a read-only semiconductor memory (hereinafter, referred to as a read-only memory [ROM]) 122, and a writable/readable semiconductor memory (hereinafter, referred to as a random access memory [RAM]) 123.

The control and communication section 12 is a control element for a program control system including peripheral circuits (not shown). This control and communication section 12 loads control programs prestored in the ROM 122 into the RAM 123, and executes them by the CPU 121.

[Modulation Method and Physical Format]

Figure 3A:
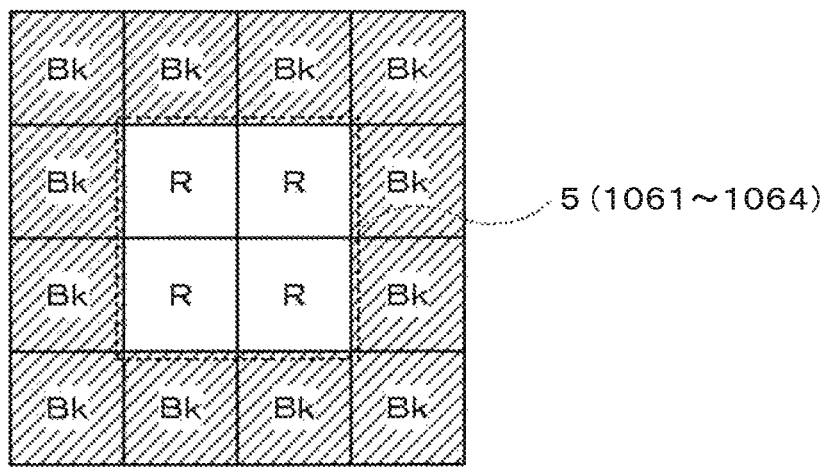
FIG. 3A is a diagram of modulation areas (light emitting section 5 [1061 to 1064]) in a lighted state.
Figure 3B:
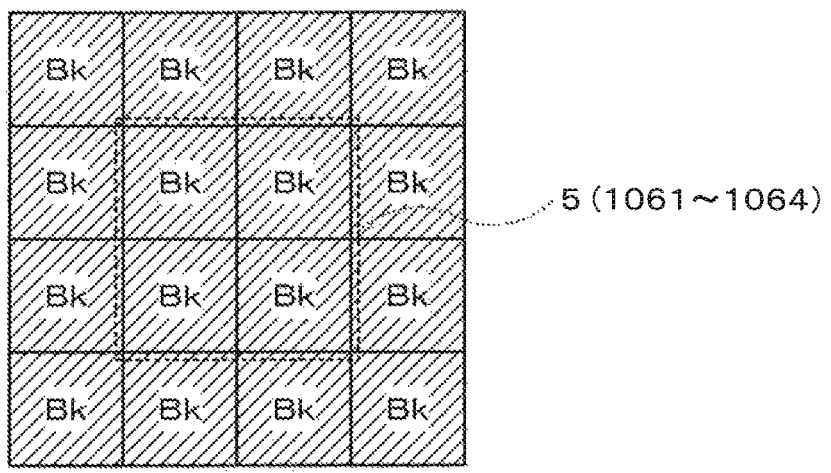
FIG. 3B is a diagram of the modulation areas (light emitting section 5 [1061 to 1064]) in an unlighted state.

FIG. 3A and FIG. 3B are diagrams of modulation areas (light emitting section 5 [1601 to 1604]) provided in portions of the display terminal 106 for digital signage. As shown in FIG. 3A, the light emitting section 5 (1601 to 1604) is expressed as a group composed of several pixels in a predetermined portion of the display terminal 106 (such as a corner of the terminal) for digital signage.

The periphery of the light emitting section 5 (1601 to 1604) composed of 2×2 pixels is surrounded by a pixel frame (in this instance, a frame composed of 12 pixels labeled Bk) that enables the receiving device 3 (108) to differentiate the light emitting section 5 (1601 to 1604) from an image for digital signage. This pixel frame is composed of black pixels that are in an unlighted state at all times.

For example, when all the pixels of the light emitting section 5 (1601 to 1604) are lit in red (R), the light emitting section 5 (1601 to 1604) enters the state shown in FIG. 3A. When all the pixels of the light emitting section 5 (1601 to 1604) are unlit, the light emitting section 5 (1601 to 1604) is black (Bk) as shown in FIG. 3B.

Note that the shape and the number of pixels of the frame section are not limited to this example.

Figure 4:
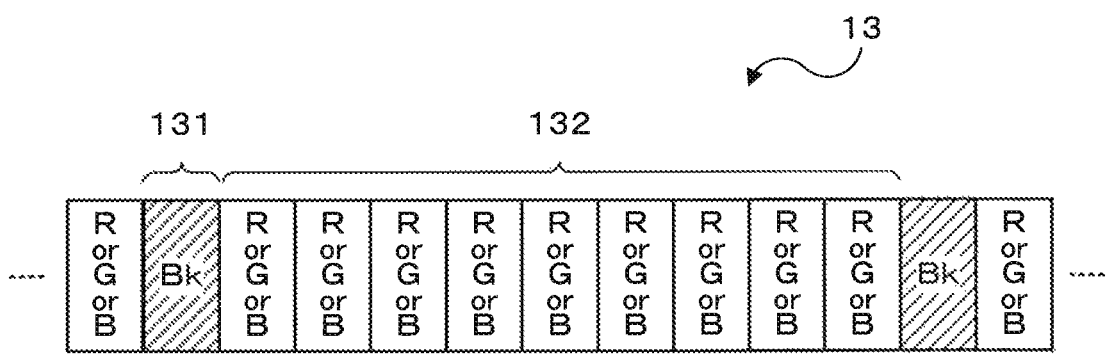
FIG. 4 is a diagram of a signal format for optical communication according to the embodiment.

FIG. 4 is a diagram of a signal format according to the present embodiment.

In FIG. 4, the signal format 13 is constituted by a header section 131 composed of one non-luminous pulse (black), and a data section 132 composed of the subsequent nine pulses in which any one of the three colors red (R), blue (B), and green (G) is lit. Since the number of colors (three colors) of the data section 132 is three-valued (R, G, B) in contrast to the binary of black (unlighted) and white (lighted) described earlier, three-value modulation, so to speak, is performed in this example.

The reason for using the single pulse in "black" in the header is that the luminance value of "black" is clearly and significantly different compared to other chromatic colors and therefore black is easier to separate without being affected by color mixing.

Note that, although the three-value modulation using three colors including red, blue, and green is performed in FIG. 4, the present invention is not limited thereto and, for example, other three colors including cyan, magenta, and yellow may be used. Alternatively, seven colors in which white is added to these colors may be used. That is, multiple values exceeding three values may be used.

The selection of color configuration (the number of values) to be used is mostly a matter of workshop modification.

For example, a color configuration considered to be suitable based on the color separation characteristics, auto white balance (AWB) characteristics, or the like of the camera 9 may be used.

Figure 5:
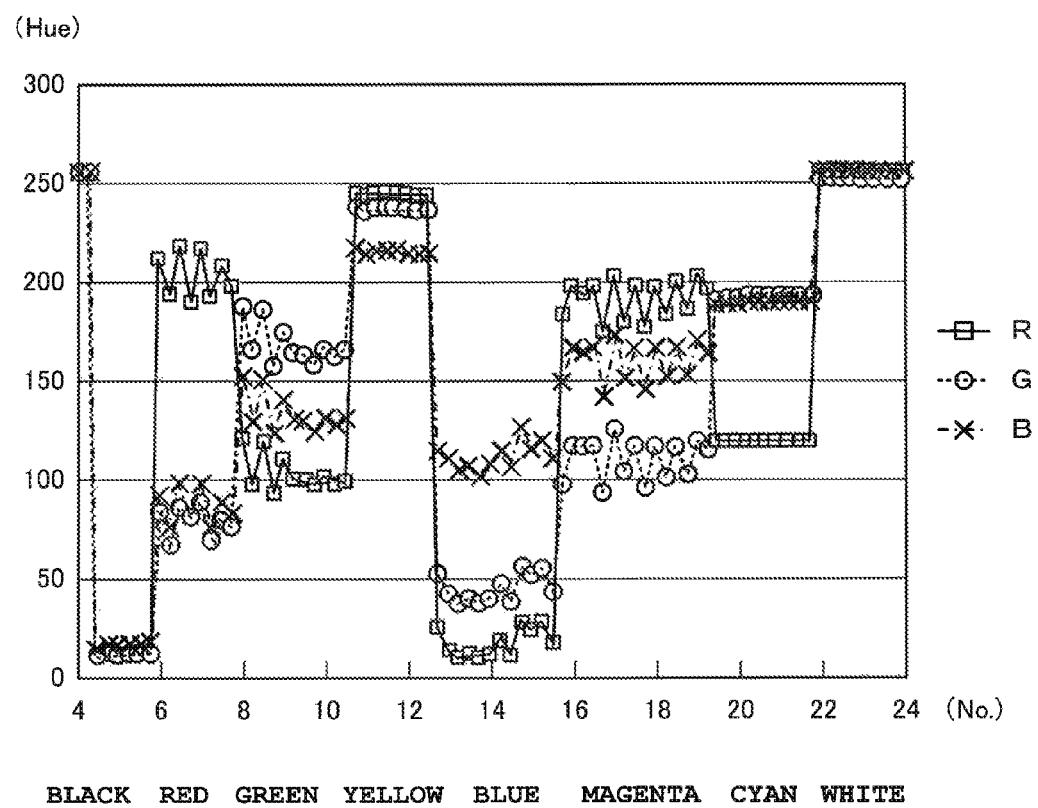
FIG. 5 is a diagram of color separation characteristics in a color filter.

FIG. 5 is a diagram of color separation characteristics of the light emitting section 5 (1601 to 1604) and the color filter of the camera 9.

As shown in FIG. 5, in actuality, slight amounts of the green wavelength component and the blue wavelength component are included even when only red is lighted.

Therefore, in the present embodiment, the three primary colors, which are red, blue, and green and relatively separable, are used.

Figure 6:
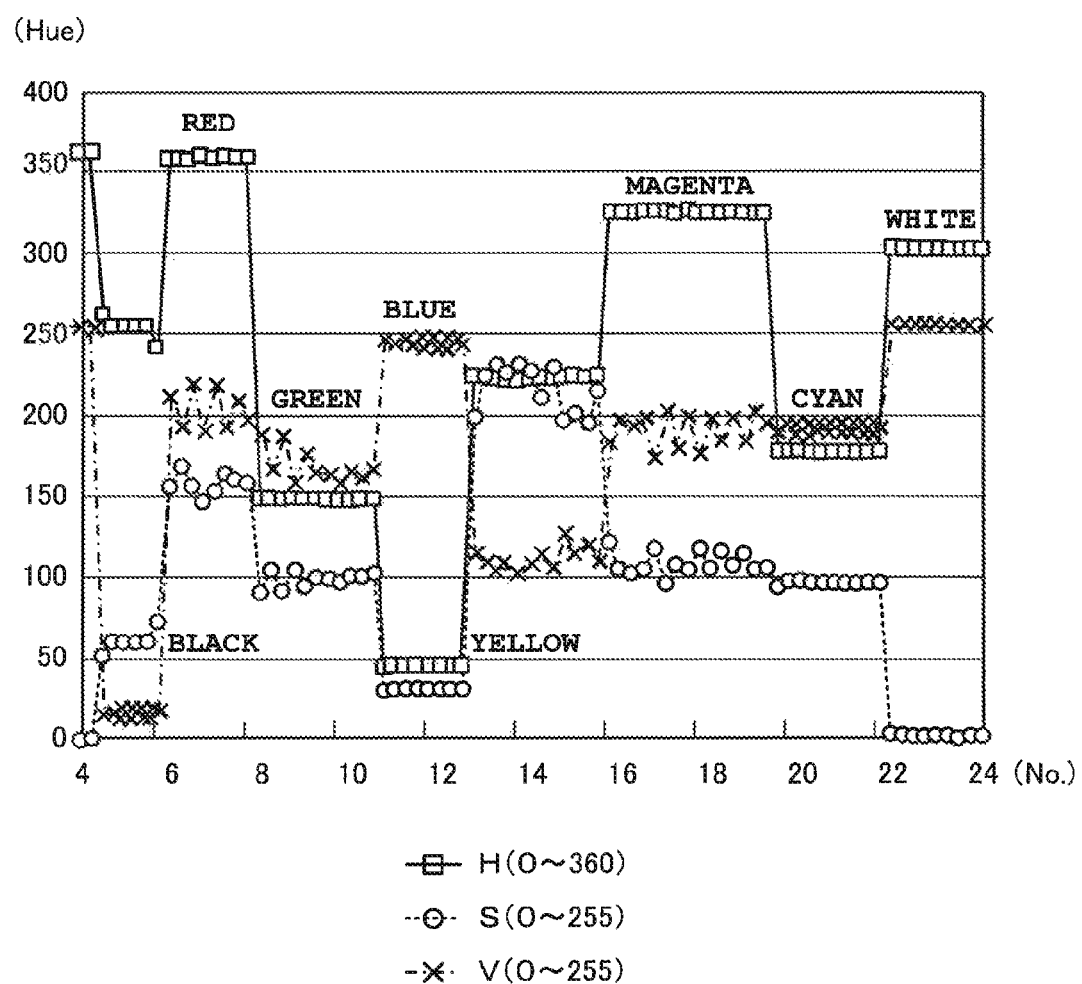
FIG. 6 is a diagram in which the results in FIG. 5 are converted to HSV space.

FIG. 6 is a diagram in which the color space in FIG. 5 is converted to hue, saturation, and value (HSV).

FIG. 6 indicates that red, green, blue, and the like that are chromatic colors have a certain saturation or more and, even when the luminance decreases, they can be easily separated and distinguished from black (unlighted).

Accordingly, with the use of color modulation such as that according to the present embodiment, the following advantageous effect can be acquired. For example, when data amounting to 9 bits in the data section 132 is to be outputted, the rational number expression for this data section 132 is "3^9" (i.e., $3^9$) in three-color modulation. This "3^9" is "19,683" in decimal notation, and this "19,683" is "100110011100011" in binary notation, or in other words, 15-bit numerical sequence. Therefore, 14 bits or more can be expressed by at least nine pulses.

FIG. 7 is a diagram showing an encoding chart for converting data values to a light-emission signal sequence.

This encoding chart is stored in advance in the ROM 122 of the control and communication section 12.

Encoding signals "1", "2", and "3" in the chart indicate "red", "blue", and "green", respectively.

Accordingly, "123" indicates that light is emitted in the order of "red to blue to green".

When an encoding signal is "132", or in other words, when light is emitted in the order of "red to green to blue", four types of encoding results are acquired.

For example, in the encoding chart in FIG. 7, a first encoding result having no redundancy is "8", and a second encoding result having low redundancy is "7". A third encoding result having medium redundancy is "7", and a fourth encoding result having high redundancy is "2".

Here, the first encoding having no redundancy is provided with 27 values, from 1 to 27.

The second encoding having low redundancy is provided with 24 values, from 1 to 24.

The third encoding having medium redundancy is provided with 8 values, from 1 to 8.

The fourth encoding having high redundancy is provided with 6 values, from 1 to 6.

The first encoding can transmit more information at a significantly higher speed than conventional binary information transmission. However, when the control and communication section 12 receives this information (captures an image) by the camera 9, a pixel area where the same color continues for a certain amount of time may be erroneously recognized as a part of a background image having no changes.

The second encoding eliminates a state in which the light emission of the same color continues for a certain amount of time (in other words, only "111", "222", and "333").

In the third encoding, an initially identified color is used as a reference, the next color is far in distance from the hue of the initially identified color.

In the fourth encoding, the colors of three consecutive pulses are different at all times, whereby noise of color existing in nature can be eliminated.

Note that the selection of encoding is made based on the environment and characteristics of equipment in which the light emitting device 2 is arranged.

Next, operations of the light receiving device 3 will be described.

Figure 8:
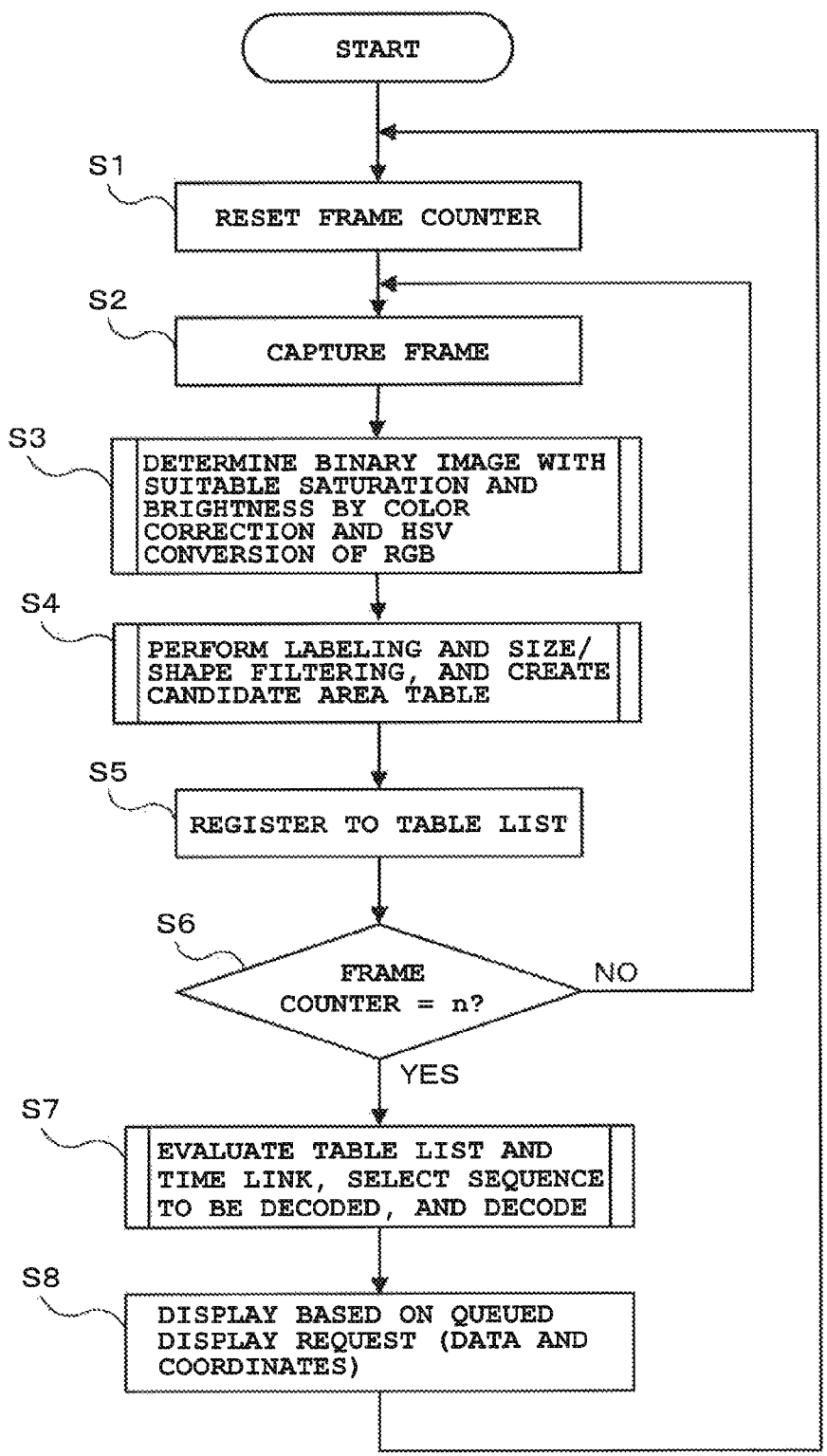
FIG. 8 is a flowchart of internal processing by a light receiving device 3.

FIG. 8 is a diagram of internal processing performed by the overall light receiving device 3.

In the processing, first, the light receiving device 3 resets a frame counter in the RAM 123 (Step S1), and stores a frame captured by the camera 9 in the RAM 123 (Step S2).

Next, the light receiving device 3 generates a binary image of the stored frame (Step S3), and after creating a candidate area table in the RAM 123 (Step S4), registers it in a list (Step S5).

Then, the light receiving device 3 judges whether or not the frame counter is a predetermined value n (Step S6). When judged that the frame counter is not the predetermined value n, the light receiving device 3 returns to Step S2. When judged that the frame counter is the predetermined value n, the light receiving device 3 performs decode processing (Step S7), and after performing information display processing (Step S8), repeats Step S1 and the subsequent steps.

More specifically, at Step S3, the following processing is performed.

[Candidate Area Detection Per Frame and Registration into Candidate Area Table]

(a) Color Enhancement Correction Processing:

As processing preceding HSV color space processing, color separation from RGB to R'G'B' is performed on modulated light of the light emitting section 5 (1061 to 1064) by digital signage, using a conversion matrix such as that in the following expression (1).

As a result of this processing, color having high saturation is further emphasized, and the separation is facilitated.

$$\begin{pmatrix} B' \\ G' \\ R' \end{pmatrix} = \begin{pmatrix} a_{11} & a_{12} & a_{13} \\ b_{11} & b_{12} & b_{13} \\ c_{11} & c_{12} & c_{13} \end{pmatrix} \begin{pmatrix} B \\ G \\ R \end{pmatrix} \quad \text{[Expression 1]}$$

The components a, b, and c in the matrix in expression (1) are, for example, values such as those in the following expression (2). In terms of vector space, the processing brings the values within the color space closer to the respective RGB axes.

$$a=(a11,a22,a33)=(-1.7,-0.65,-0.1)$$

$$b=(b11,b22,b33)=(-0.9,1.9,-0.1)$$

$$c=(c11,c22,c33)=(-0.1,-0.1,1.1) \quad (2)$$

(b) Conversion to HSV Color Space

The saturation of the captured image is unaffected by the surrounding environment and is mostly unchanged. Conversely, the value of each color vector on which RGB decomposition has been performed has a characteristic of being affected by the surrounding environment. In order to address such characteristics in conventional luminance-based search, search is performed by conversion to an HSV color specification system, rather than expression in RGB.

In the instance of the color modulation method and the color modulation indicated by the above-described physical format, the imaging results of the pulses in the data section have high saturation (S) values at all times, regardless of the color of the emitted light, even when the hue slightly fluctuates.

Figure 9:
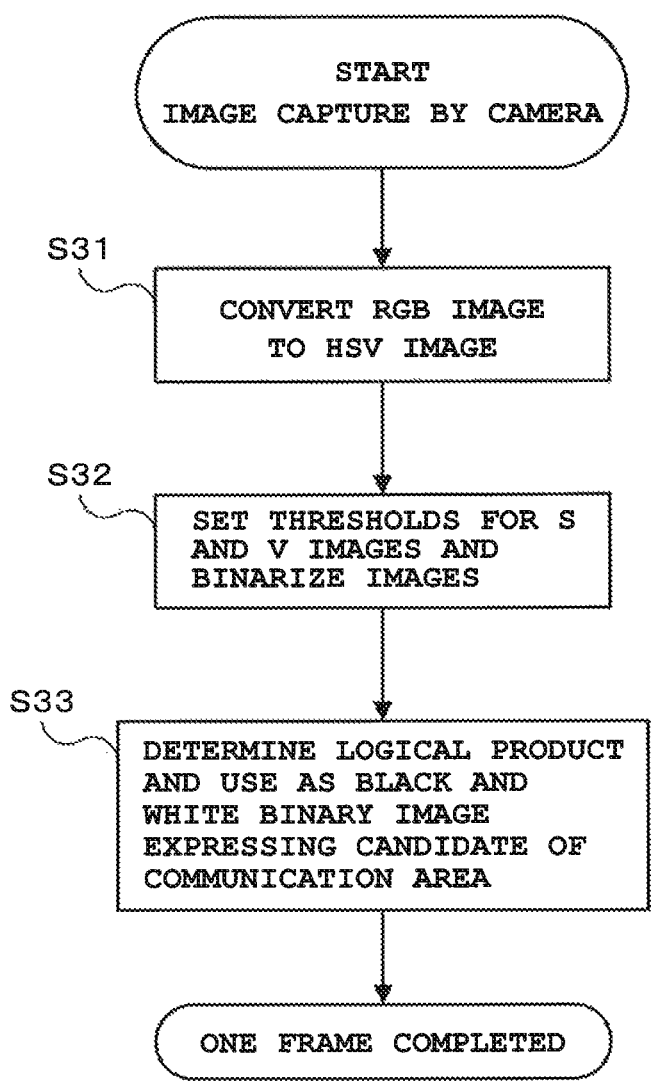
FIG. 9 is a sub-flowchart of Step S3 in FIG. 8.

FIG. 9 is a detailed diagram of the processing at Step S3 in FIG. 8.

As shown in FIG. 9, in the processing at Step S3, the light receiving device 3 converts the captured image in the RGB color space to an image in the HSV color space (Step S31). Next, the light receiving device 3 sets a suitable threshold value for each pixel of an image expressed by the S (saturation) parameter (hereinafter, referred to as an S image), and an image expressed by the V (brightness: also referred to as I [intensity]) parameter (hereinafter, referred to as a V image) in the converted image expressed in the HSV color space, and binarizes them (Step S32).

The S image and the V image acquired thereby and a logical product thereof are set as a black and white binary image expressing a candidate for a communication area (Step S33).

[Labeling Processing]

Next, labeling processing that is one of the characteristic features of the present embodiment will be described.

In this processing, an image of an area where a light-modulated area excluding the header section 131 is included at all times and color characteristics coincidentally match is acquired as a black and white binary image. As a result, for example, an image is acquired in which an area having a high likelihood of color characteristics is white against a black background.

Figure 10:
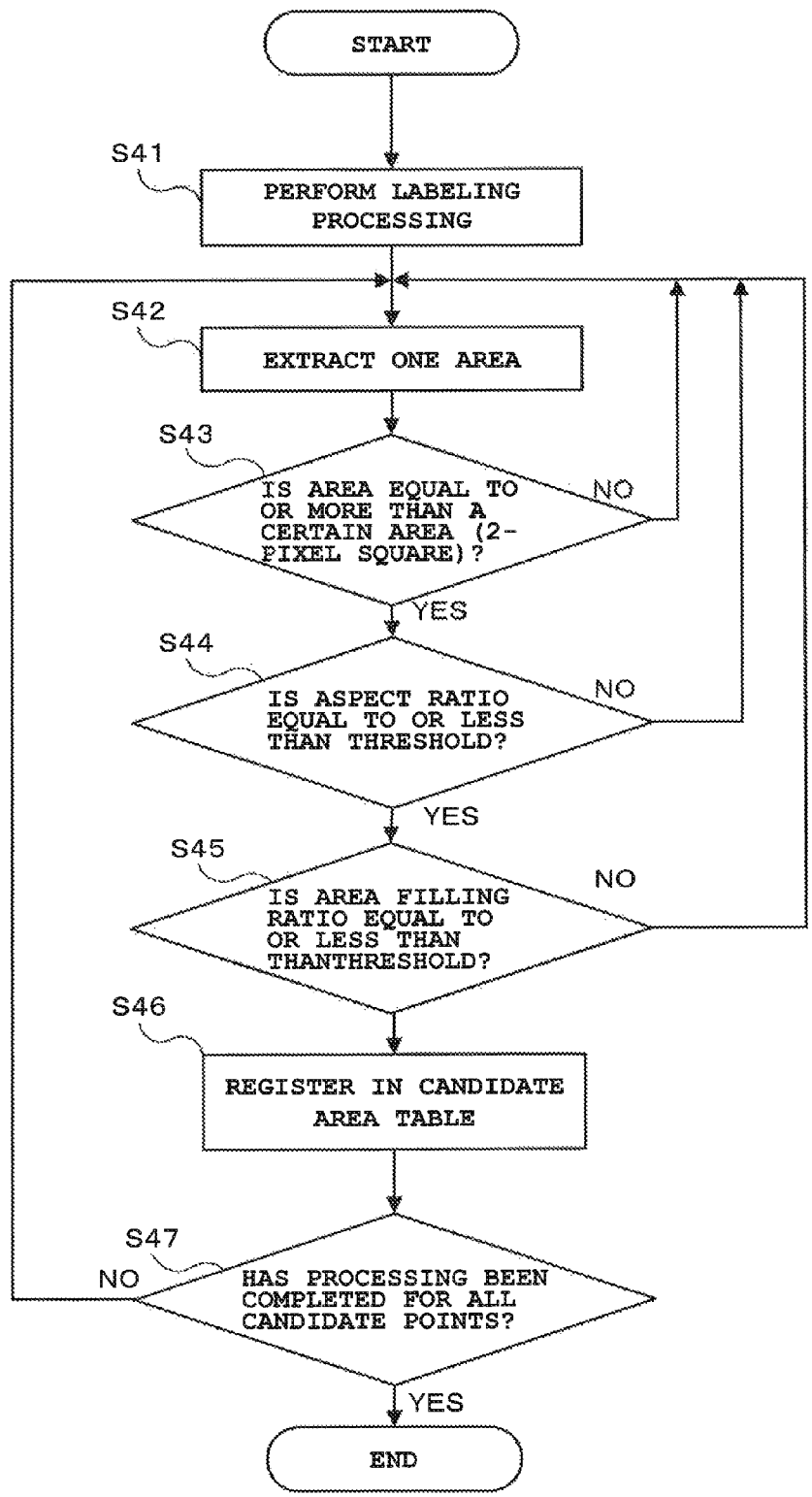
FIG. 10 is a sub-flowchart of Step S4 in FIG. 8.

FIG. 10 is a detailed diagram of the processing at Step S4 in FIG. 8.

As shown in FIG. 10, first, the light receiving device 3 performs a so-called labeling processing in which a continuous area and a basic shape parameter are identified (Step S41). More specifically, the light receiving device 3 performs processing for identifying each continuous white area in the above-described candidate image and determining the shape information thereof.

Note that, in the present embodiment, the gravity center of the area, the area (pixel area) thereof, and the coordinates of the four corners of the circumscribed quadrangle area thereof are acquired.

In the subsequent processing, the light receiving device 3 extracts one of the acquired continuous areas (Step S42) and performs filtering based on shape-related conditions. First, the light receiving device 3 eliminates areas that are too small (such as a 2×2-pixel square or smaller) in terms of area (area size) as noise (Step S43).

Next, the light receiving device 3 evaluates the shape of an area detected as a result of the labeling processing at Step S41. In the present embodiment, for simplification of the processing, the light receiving device 3 performs the evaluation based on the shape likelihood using the aspect ratio (Step S44).

FIG. 11A to FIG. 11D are diagrams for explaining the shape evaluation of the modulation area.

Figure 11A:
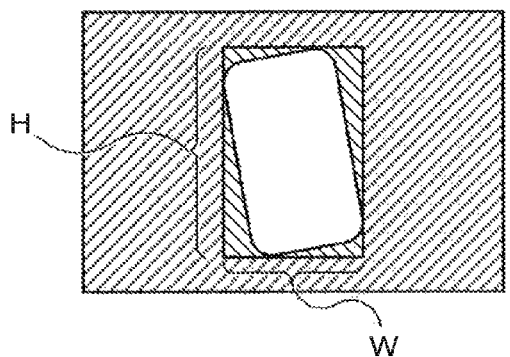
FIG. 11A is a diagram showing an instance where the shape evaluation of a modulation area is performed by aspect ratio, in which the modulation area in the shape of a square is circumscribed within a square.
Figure 11B:
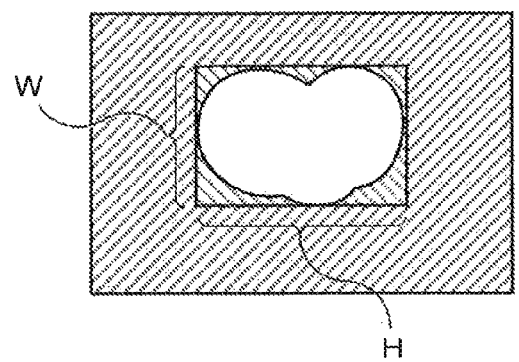
FIG. 11B is a diagram showing an instance where the shape evaluation of a modulation area is performed by aspect ratio, in which the modulation area having an irregular shape is circumscribed within a square.
Figure 11C:
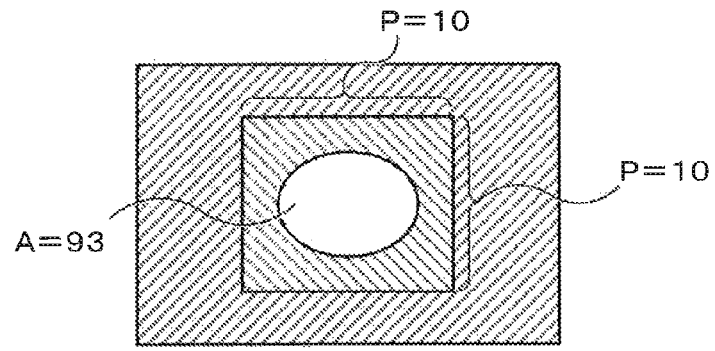
FIG. 11C is a diagram showing an instance where the shape evaluation of a modulation area is performed by area filling ratio, in which the shape of the modulation area is substantially oval.
Figure 11D:
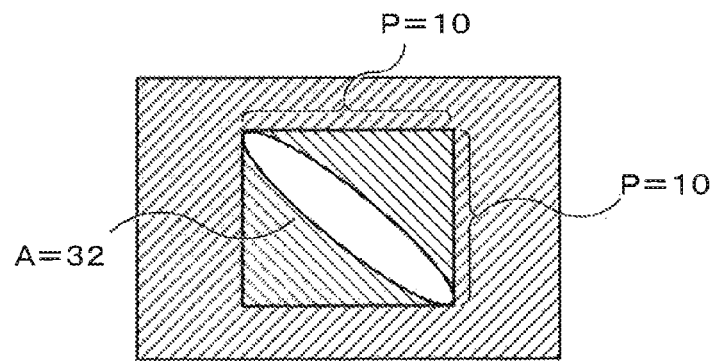
FIG. 11D is a diagram showing an instance where the shape evaluation of a modulation area is performed by area filling ratio, in which the shape of the modulation area is elongated oval.

FIG. 11A and FIG. 11B are diagrams showing the aspect ratio of the shape (white portion) of the modulation area. H is the long-side length of the circumscribed quadrangle of the shape of the modulation area, and W is the short-side length of the circumscribed quadrangle of the shape of the modulation area. FIG. 11C and FIG. 11D are diagrams showing the area filling ratio of the shape of the modulation area in relation to a predetermined area P (10×10 pixels in FIG. 11C and FIG. 11D). This area filling ratio is acquired by a value that is the area A of the shape (white portion) of the modulation area divided by the predetermined area P (10×10 pixels).

As described above, conditions under which an area is considered to be a modulation area are set in advance regarding the aspect ratio and the area filling ratio, whereby areas that do not meet the conditions are not considered to be modulation areas (Step S45).

An area that has not been eliminated has a high possibility of being a modulation area, and therefore the light receiving device 3 registers it in the candidate area table (Step S46). Subsequently, until it is judged that the processing has been completed on all candidate areas that may possibly be a modulation area (YES at Step S47), the light receiving device 3 repeats the above-described Steps S42 to S45.

As a result, list entries for a required number of frames are acquired from Step S1 to Step S6, and registered as a table list.

However, because the phase relationship is indefinite, sampling by frames is twice the pulse cycle, or in other words, 30 fps in relation to 15 Hz-pulse-based modulation. Accordingly, since the number of pulses constituting a block is 10 pulses as described above, the list entries are n=2× 10=20 and a buffering state is such as that shown in FIG. 12 described hereafter.

As described above, in the present embodiment, filtering based on shape-related conditions is performed for a modulation area, whereby shapes that are, for example, clearly different or clearly too small are eliminated in advance. Therefore, processing load related to the searching of an information light source area by the light receiving device 3 can be reduced.

In the actual implementation thereof, when frame analysis is performed, and the current image-capturing condition (the surrounding environment, the state of camera shake, and the like) is clearly unsuitable for communication during the process of creating a candidate area table and adding to a table list, such as when the number of detected candidate areas is consecutively zero for a certain number of times, the processing can be reset during the process.

[Filtering Processing for Decode Processing Candidate]

Figure 12:
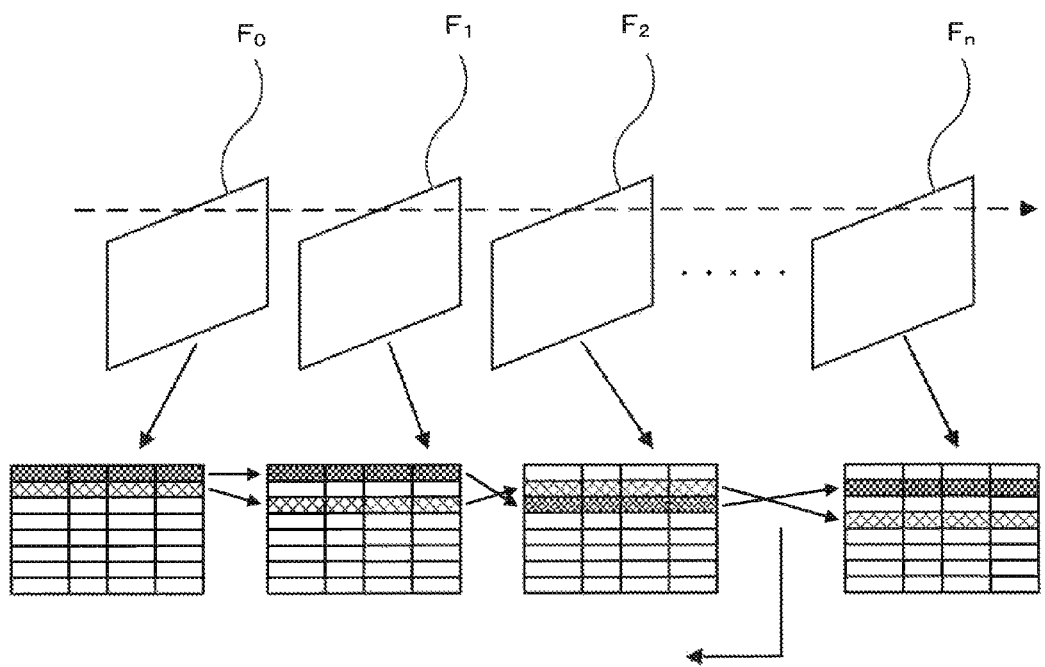
FIG. 12 is a diagram showing a buffering state of a buffer memory provided in a RAM 123.

FIG. 12 is a diagram showing a buffering state of a buffer memory provided in the RAM 123.

F0 to Fn in the upper portion are frames, and the tables in the lower portion indicate the buffering state of a candidate area table for each frame F0 to Fn.

Note that a number of candidate area tables amounting to the n-number of frames (n is a natural number) are provided. When a predetermined number of frames is reached, the content is rewritten.

The reason for providing a candidate area table for each frame is to significantly reduce the amount of calculation through use of compressed information as a candidate area table, rather than processing a large number of images in a time direction at a pixel data level, when processing time-series images.

Here, an example of the candidate area table which is generated for each captured (imaged) frame will be described.

FIG. 13 is a diagram showing an example of a candidate area table for frame number Fn=0.

In FIG. 13, gravity center coordinates (cx, xy), area (size), and hue value (hue) are shown for each area No. (A).

For example, gravity center coordinates (10,50), an area (70), and a hue value (80) are shown for area No. 0.

Also, gravity center coordinates (111,321), an area (23), and a hue value (200) are shown for area No. 1.

As described above, in the present embodiment, the gravity center coordinates (cx,xy) of an area subjected to labeling processing, the area (size) thereof, and the hue value (hue) thereof are successively stored in a candidate area table.

Note that, in the description below, the identification of an individual candidate area is expressed as Fn:Am, and the identification of its internal parameter is expressed as Fn:Am:(cx,cy).

Also, in the present embodiment, the distance between two area gravity centers (x1,y1) and (x2,y2) is determined using area information.

However, because the area is already a dimension that is the square of the coordinates, consideration is given to enable addition as an evaluation measure of the same dimension.

$$\sqrt{((x2-x1)^2+(y2-y1)^2+(\sqrt{Size2}-\sqrt{Size1})^2)} \quad (3)$$

Expression (3) indicates that, after square root calculation is performed on the area, the distance calculation of ordinary vectors in three dimensions is performed.

In actuality, expression (3) is operated within a range of relatively small threshold values (such as 0 to 10). Therefore, to obtain a similar evaluation value while reducing the calculation amount, such as squaring the entirety, expression (3) may be modified as the following expression (4).

$$(x2-x1)+(y2-y1)+\sqrt{(Size2-Size1)} \quad (4)$$

As a result of the calculation, it can be considered that "small evaluation value=same area" in similarity evaluation between modulation areas.

Figure 14:
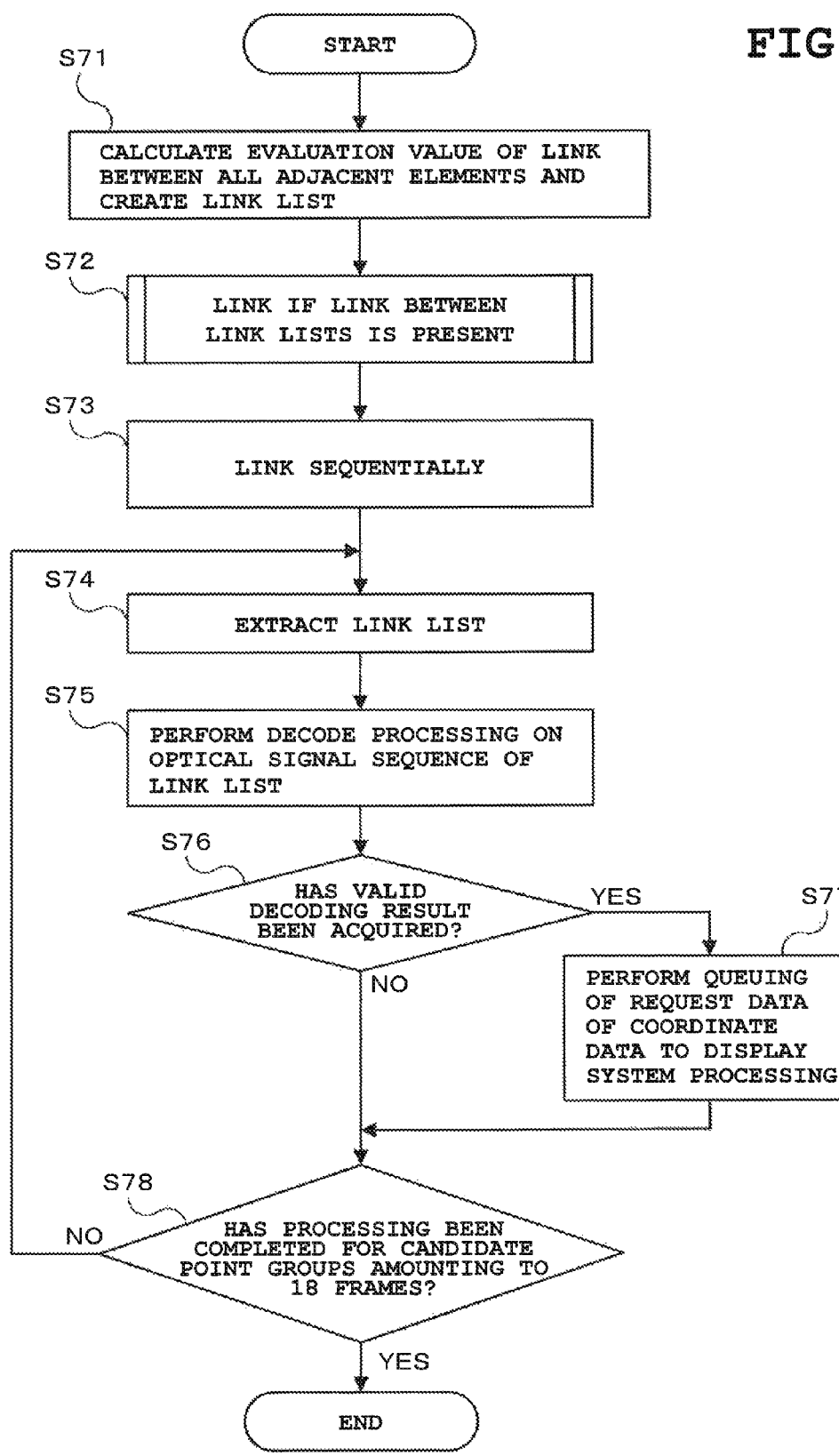
FIG. 14 is a sub-flowchart of Step S7 in FIG. 8.

FIG. 14 is a flowchart showing the details of the processing at Step S7 in FIG. 8.

In the flowchart, the light receiving device 3 inputs a candidate frame point of a processing target frame and a candidate frame point of a frame previously acquired for one to three frames into the above-described expression (4), and calculates the evaluation value. Next, the light receiving device 3 creates a link list of the candidate frame point of the processing target frame and the candidate frame point of the frame previously acquired for one to three frames, using the evaluation value (Step S71).

Next, the light receiving device 3 successively links the link list between the two frames, while interpolating frames in which a coordinate point is not present due to being black (non-light-emitting) as black data within a permitted range (two frames in this instance), and determines a chain of coordinate point groups running 18 frames (Step S72).

Next, the light receiving device 3 eliminates discontinuous link elements in which three frames have passed without the presence of a candidate point, and rearranges a collection of coordinate point groups amounting to 18 frames such that the beginning of the like is black (Step S73).

Next, the light receiving device 3 extracts a complete link area constituted by related coordinate point groups amounting to 18 frames (Step S74). Then, the light receiving device 3 performs decode processing on a hue value (optical signal sequence) corresponding to each coordinate point (Step S75), and judges whether or not a valid decoding result (decoding value) has been acquired (Step S76).

When judged that a valid decoding result has been acquired, the light receiving device 3 performs request queuing for coordinates and data to display system processing so that the word balloon 111 and the like are displayed (Step S77). Next, the light receiving device 3 judges whether or not the processing has been completed for all candidate point groups amounting to 18 frames (Step S78). Even when a valid decoding result is not acquired, the light receiving device 3 judges whether or not the processing has been completed for all candidate point groups amounting to 18 frames. In either case, when judged that the processing has not been completed for all candidate point groups amounting to 18 frames, the light receiving device 3 repeats Step S74 and the subsequent steps.

Figure 15:
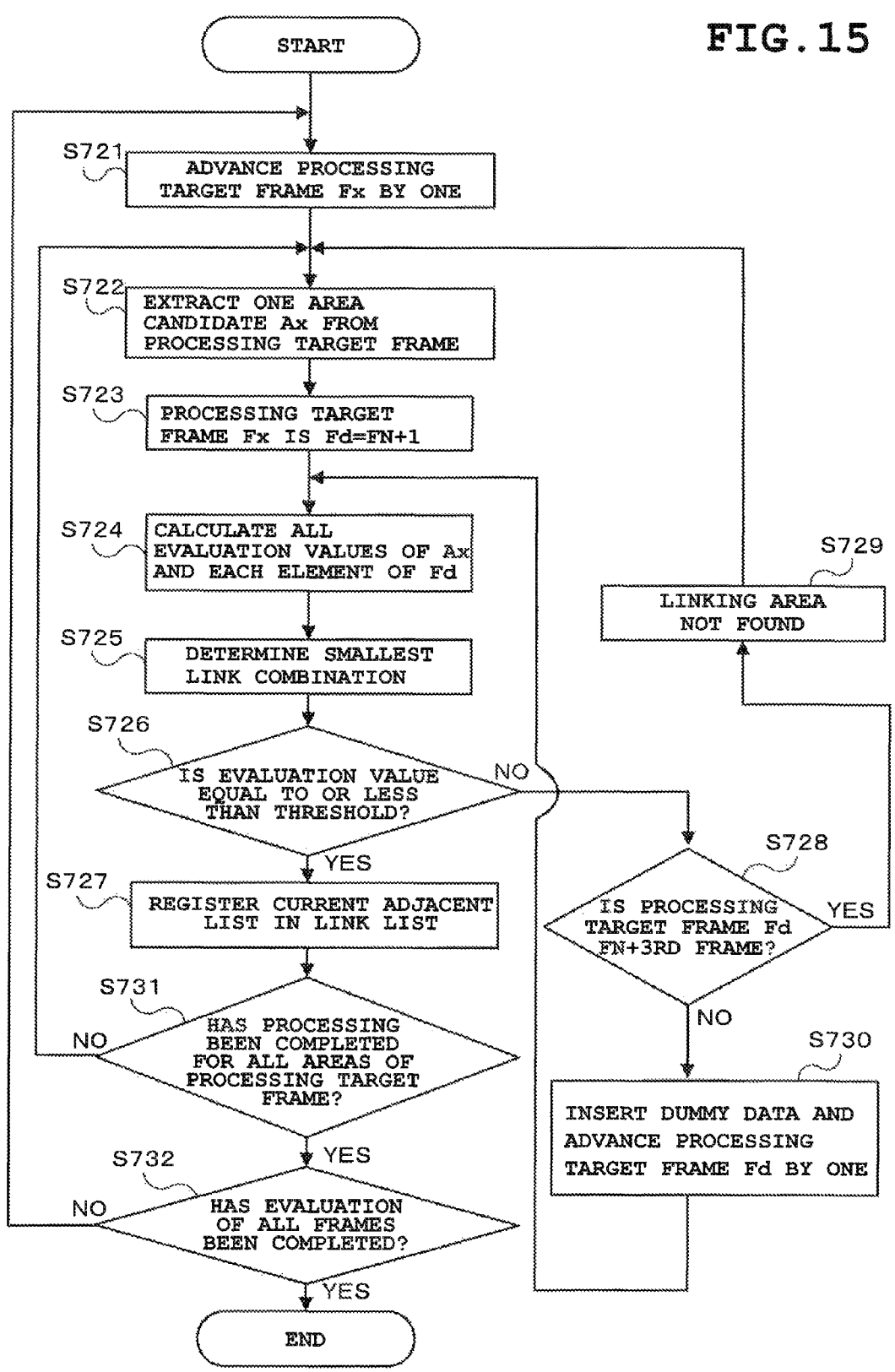
FIG. 15 is a sub-flowchart of Step S72 in FIG. 14.

FIG. 15 is a flowchart showing the details of the processing at Step S72.

In the flowchart, first, the light receiving device 3 defines a processing target frame Fx, and advances the processing target frame Fx by one in the forward direction in terms of time (Step S721). Next, the light receiving device 3 extracts one area candidate Ax from the processing target frame Fx (Step S722) and defines the processing target frame Fx as Fd=Fn+1 (Step S723).

Next, the light receiving device 3 calculates an evaluation value of the area candidate Ax and each element of the processing target frame Fd using the above-described expression (4) (Step S724), and determines a smallest link combination based on the evaluation value (Step S725).

Next, the light receiving device 3 judges whether or not the evaluation value of the determined smallest link combination is equal to or less than a threshold set in advance (Step S726). When judged that the evaluation value is not equal to or less than the threshold, the light receiving device 3 judges whether or not the current processing target frame Fd is the fn+3rd frame (Step S728). When judged that the current processing target frame Fd is the fn+3rd frame, the light receiving device 3 judges that a linking area has not been found (Step S729), and repeats Step S722 and the subsequent steps.

At Step S728, when judged that the current processing target frame Fd is not the fn+3rd frame, the light receiving device 3 inserts dummy data ("skip") and advances the processing target frame Fd by one in the forward direction in terms of time (Step S730). Then, the light receiving device 3 repeats Step S724 and the subsequent steps.

At Step S726, when judged that the evaluation value of the smallest link combination is equal to or less than the threshold set in advance, the light receiving device 3 registers the current list in the link list as an adjacent list (Step S727), and judges whether or not the processing has been completed for all areas of the processing target frame (Step S731). When judged that the processing has not been completed, the light receiving device 3 repeats the processing at Step S722 and the subsequent steps. When judged that the processing has been completed, the light receiving device 3 judges whether or not evaluation of all frames has been completed (Step S732). When judged that the evaluation has not been completed, the light receiving device 3 returns to Step S721. When judged that the evaluation has been completed, the light receiving device 3 ends the processing.

Note that, in expression (4) of the present embodiment, an evaluation value of 30 or less is "considered the same".

In the physical format according to the present embodiment, when saturation and brightness are high, linking is performed. However, because a header (black) is included at all times, the linking of area tables per frame when the processing at FIG. 15 is performed is as shown in FIG. 16.

Figure 16:
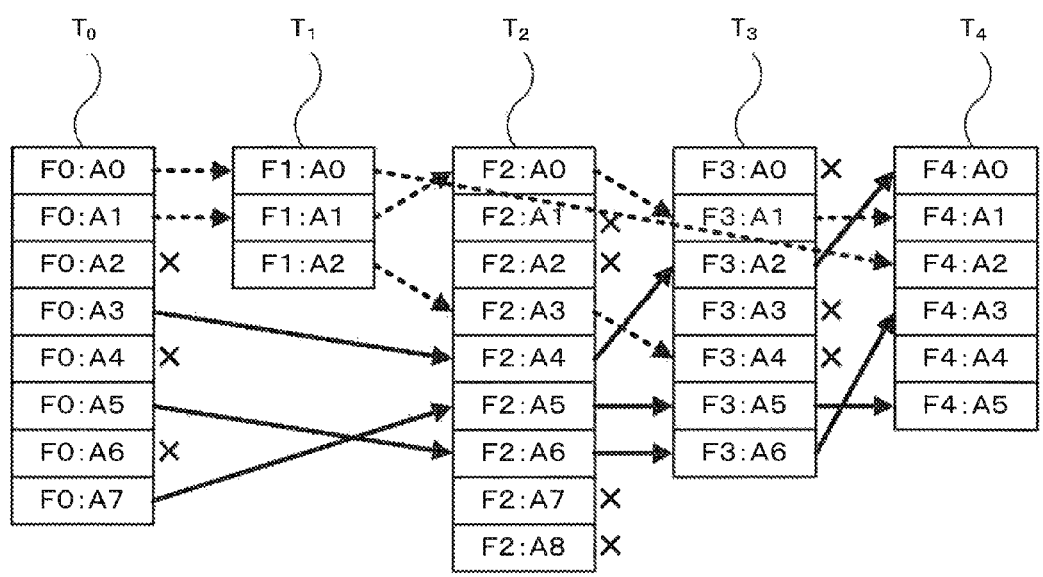
FIG. 16 is a diagram showing an image of the linking of area tables.

FIG. 16 is a link image of area tables.

In this image, sections connected by solid lines indicate the linking status of each candidate area where visible optical communication is performed.

On the other hand, the dotted lines indicate a status in which, although whether or not communication is being performed is not clearly determined, linking on an evaluation value level is judged to have been made.

At Step S73, the determined link is evaluated. In an area where a modulation signal is present at this time, a path (a connection of decoding results) that is linked over all 20 frames is present at all times. Therefore, other areas are eliminated.

Figure 17:
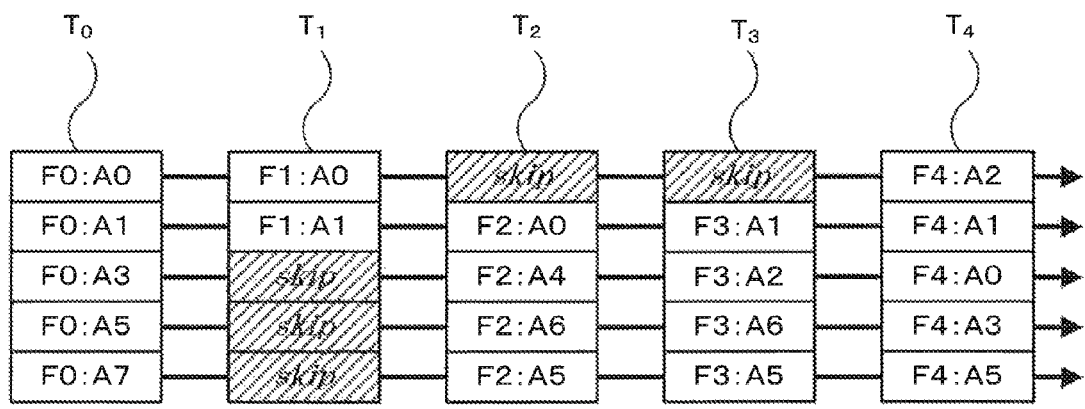
FIG. 17 is a diagram showing a simplified image of the successively linked areas.

FIG. 17 is a diagram showing a simplified image of areas judged to be successively linked. Images that have skipped the link are considered black (non-illuminated), and interpolated as having a saturation of 0. The hue data of area Am of other images are extracted, respectively.

FIG. 18 is a diagram showing an example of hue data extraction when a hue value has a range of 0 to 360. In FIG. 18, only a hue value held in each candidate area element data (individual F0:A0 and the like) are arrayed, corresponding to the result rearranged as the final link candidates in FIG. 17.

In this way, a candidate as a time-based link is determined from the color and shape candidates of a single frame. The optical signal value held by the link area in FIG. 17 (when changed to hue value link, in the case of the present embodiment) becomes that shown in FIG. 18, if the hue value is considered to have a range of 0 to 360 as in typical definition. Areas judged to be in an unlighted state and skipped are considered to have a value that is clearly out of the hue value range (such as −1).

Returning to the flowchart in FIG. 14, first, the CPU 121 eliminates link areas that cannot be present as modulation areas. These areas are candidate areas meeting a condition "the header section 131 (−1 state) is not present".

When 19 frames are sampled in the above-described physical format, a signal area always has one or two unlighted periods (due to phase relationship between signal pulse and frame capture timing). Therefore, an area where "one or two consecutive −1 does not occur only once" is eliminated (an area where −1 is still present after other values are removed from −1 is not considered to be a signal).

The value sequence of an area meeting this condition is selected. For example, in the case of the example in FIG. 18, area No. 1 is eliminated because unlighted timing is not present.

Next, the hue value sequence is cyclically shifted to start from one or two consecutive −1.

The processing up to this point is the processing at Step S73.

At Step S74 and Step S75, the CPU 121 checks validity regarding modulation of each link result, selects a phase, and performs demodulation.

[Threshold Setting]

Figure 19:
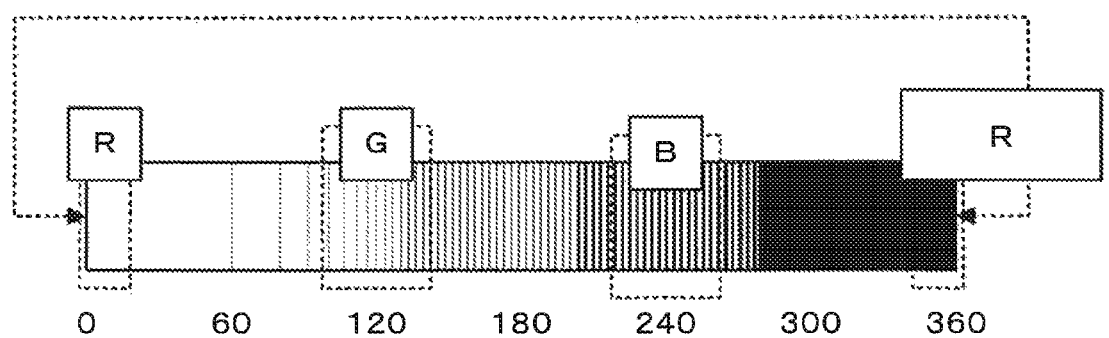
FIG. 19 is an explanatory diagram of threshold setting.

FIG. 19 is an explanatory diagram of threshold setting.

As shown in FIG. 19, the threshold of a possible range of a color emitting pulse of a modulation signal is set on a hue axis, taking into consideration color characteristics on the camera side (including the effect of dynamic AWB control) and light source on the transmitting side. For example, the threshold of R is near 0 (or 360), the threshold of G is near 120, and the threshold of B is near 240.

Note that, although the threshold is fixed in the present embodiment, the threshold may be dynamically optimized by being set in accordance with an environment matching the characteristics of the camera 9 or set in a valley between peaks in hue distribution.

In addition, it is preferable that these threshold values are optimized for each light-emitting point, whereby a more stable reception can be performed even when receiving a plurality of light-emission signals having different color characteristics.

As described above, a color that changes at 15 Hz (pulse cycle of 66 ms) is sampled at 30 fps by the camera 9. Therefore, the 18 sample sequences can be considered to be constituted by two phases A and B.

An example of change in hue value in which a peak considered to be an unlighted state comes at the beginning as described above is as follows.

Figure 20:
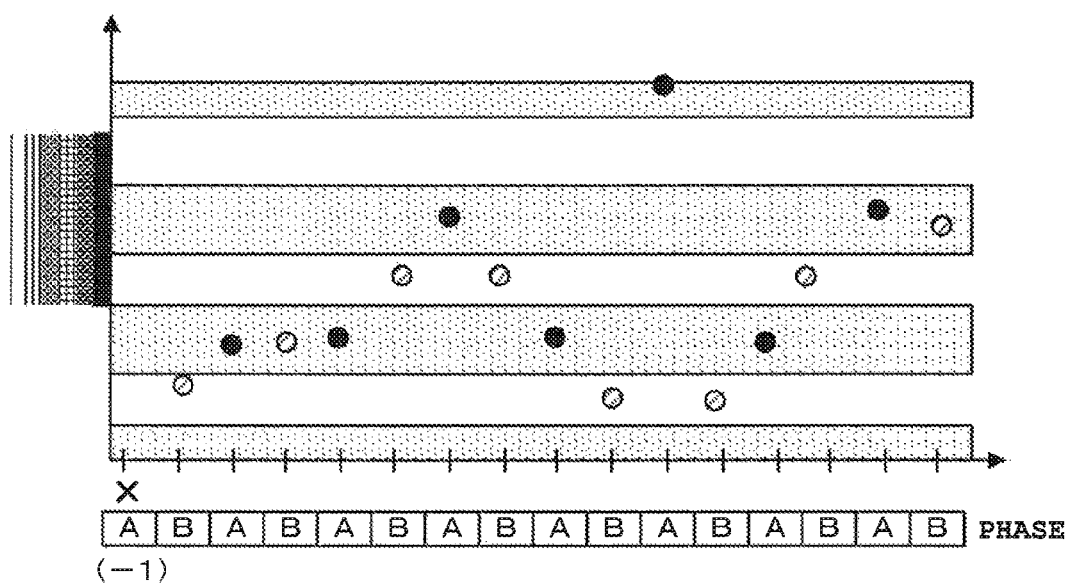
FIG. 20 is a diagram showing an example of changes in hue value.

FIG. 20 is a diagram showing an example of change in hue value, in which the vertical axis is a hue value, the horizontal axis is a frame number, and phase A and phase B are arrayed along the horizontal axis. As shown in FIG. 20, the pattern of change in hue value varies. In this instance, phase A is comparatively an optimal phase, and the color changes at phase B at all times.

Regarding a phase relationship with the light source, a value within the thresholds may be acquired in phase A and phase B. For example, in transition from R near zero to B, the intermediate value is near 300 between B and R, rather than G. Conversely, in transition from R near 340 to G, the intermediate value is near 60 of Y, rather than phase B.

In either case, when the area candidate is a modulation signal, either of the phase A sequence and the phase B sequence is within the value range thresholds at all times.

By the above-described processing, the area where the communication is being made has been determined, and the change in optical signals at an observation value level has been expressed by a color information row that can be applied to a decoding table. Next, when the color information row is collated with the decoder table in FIG. 7, transmission bit data is acquired.

A noise area where saturation, spatial shape, time-based linking and the like coincidentally match is, of course, eliminated based on the rule in FIG. 7 regarding redundancy. Therefore, it is highly unlikely that changes in nature are coincidentally taken as data.

In the processing of the present embodiment, changes in nature may coincidentally match. Accordingly, it is preferable that reception error is prevented by error detection, correction, and the like for the higher-order layers.

As a result, the following effects can be achieved by the present embodiment.

A. Since the optical transmission method is used in which color modulation is performed by at least three-values, and $3^9$ is equal to or greater than 14 bits in, for example, three-color modulation, 14 bits or more can be expressed in nine pulses, whereby transmitting time can be shortened.

B. In the decoding processing for image sensor communication, table-based time-direction processing of frames is performed. Therefore, the amount of processing to be handled can be significantly reduced.

C. Time-based change in an area is made by the center of gravity and size change. Therefore, link judgment having a high degree of relevance can be performed.

D. The transmitting side performs repeated transmissions of a fixed length. Therefore, rather than finding a header and starting sampling for communication, data amounting to a data block length is stored and a header is retrieved from the stored data. As a result, response time for communication acquisition can be minimized.

E. The detection of a modulation area is performed after filtering based on shape conditions, such as the elimination of shapes that are clearly different or too small, being performed. Therefore, processing load on the light receiving device 3 related to the searching of an information light source can be reduced.

While the present invention has been described with reference to the preferred embodiments, it is intended that the invention be not limited by any of the details of the description therein but includes all the embodiments which fall within the scope of the appended claims.

What is claimed is:

1. An information sending device comprising:
   a table in which signals included in information to be transmitted are associated with information on color changes in a plurality of stages based on redundancy;
   a modulating section which modulates the information to be transmitted into signals composed of changes in color by referencing the table; and
   a light emission control section which controls a light emitting section which emits light in a plurality of colors to emit light while changing color temporally based on the signals generated by the modulating section,
   wherein the light emission control section further controls the light emitting section by setting a temporal color change period comprising a light emission period in which the light emission control section controls the light emitting section to emit light while changing color of the emitted light temporally and a non-light emission period in which the light emission control section controls the light emitting section to not emit light, and during which the color of the temporal color change period is black.

2. The information sending device according to claim 1, wherein a configuration of the color changes is determined based on color separation characteristics or color shade adjustment characteristics of a light receiving device for receiving the color changes during light reception.

3. The information sending device according to claim 2, wherein the light receiving device includes an image sensor.

4. The information sending device according to claim 1, wherein the light emitting section is a pixel area of an image display section which emits light in a plurality of colors in pixel units.

5. The information sending device according to claim 4, wherein the pixel area has a frame display area set around a periphery thereof which is used to differentiate from an image displayed outside of the pixel area.

6. An information sending method comprising:
   modulating information to be transmitted into signals composed of changes in color by referencing a table in which signals included in the information to be transmitted are associated with information on color changes in a plurality of stages based on redundancy; and
   controlling a light emitting section which emits light in a plurality of colors to emit light while changing color temporally based on the signals generated in the modulating,
   wherein the light emitting section is further controlled by setting a temporal color change period comprising a light emission period in which the light emission control section controls the light emitting section to emit light while changing color of the emitted light temporally and a non-light emission period in which the light emission control section controls the light emitting section to not emit light, and during which the color of the temporal color change period is black.

7. A non-transitory computer-readable storage medium having a program stored thereon that is executable by a computer to control the computer to perform functions comprising:
   modulation processing for modulating information to be transmitted into signals composed of changes in color by referencing a table in which signals included in the information to be transmitted are associated with information on color changes in a plurality of stages based on redundancy; and
   light emission control processing for controlling a light emitting section which emits light in a plurality of colors to emit light while changing color temporally based on the signals generated by the modulation processing,
   wherein the light emission control processing further controls the light emitting section by setting a temporal color change period comprising a light emission period in which the light emission control section controls the light emitting section to emit light while changing color of the emitted light temporally and a non-light emission period in which the light emission control section controls the light emitting section to not emit light, and during which the color of the temporal color change period is black.

* * * * *